A. A. FRECHETTE.
SNAP HOOK.
APPLICATION FILED MAY 19, 1922.

1,436,390. Patented Nov. 21, 1922.

INVENTOR
ALFRED. A. FRECHETTE

BY Fetherstonhaugh & Co.
ATT'YS

Patented Nov. 21, 1922.                                                    1,436,390

UNITED STATES PATENT OFFICE.

ALFRED ANTOINE FRECHETTE, OF TRAIL, BRITISH COLUMBIA, CANADA.

SNAP HOOK.

Application filed May 19, 1922. Serial No. 562,134.

*To all whom it may concern:*

Be it known that I, ALFRED ANTOINE FRECHETTE, a subject of the King of Great Britain, and resident of Trail, in the Province of British Columbia, Dominion of Canada, have invented certain new and useful Improvements in Snap Hooks, of which the following is a specification.

This invention relates to improvements in snap hooks, and has for its objects to provide a snap hook in which the hook is located at right angles to the eye fastening the end of the strap, to provide a means whereby the hook is formed of two members which are strapped through the action of a spring housed in a recess provided in the shanks of the snap hook.

Further objects are to provide a means whereby the object to be snapped may be easily engaged by the hook and which means consists of a pair of spread ribs provided at the outer end of the device.

Further objects are to provide an improved snap hook that is simple in construction, not liable to go out of repair, and generally to adapt the several parts to better perform the functions required of them.

With the above and other objects in view, the invention consists essentially of the improved construction hereinafter described in detail in the accompanying specification and drawings.

In the drawings.

Like characters of reference indicate corresponding parts in all the figures.

Figure 1:
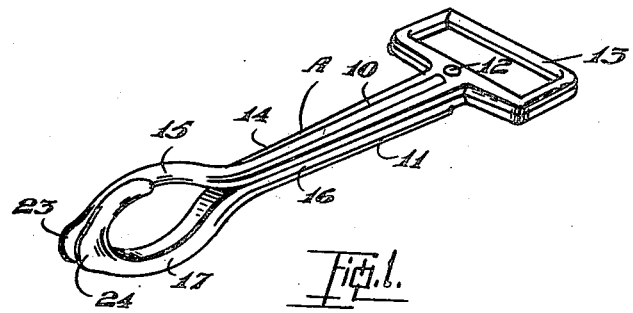
Figure 1 is a perspective view of the improved snap hook.
Figure 2:
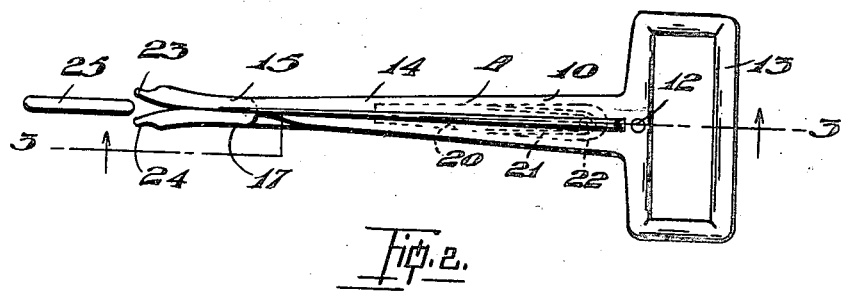
Figure 2 is a plan view of the same.
Figure 3:
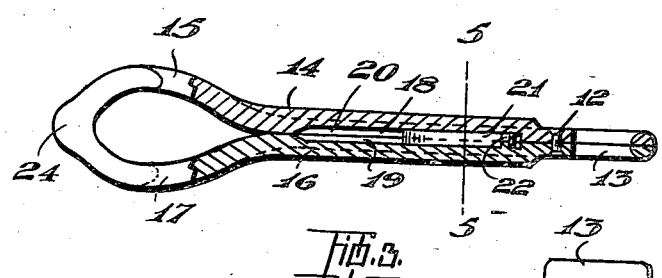
Figure 3 is a longitudinal section on the line 3—3 of Figure 2.
Figure 4:
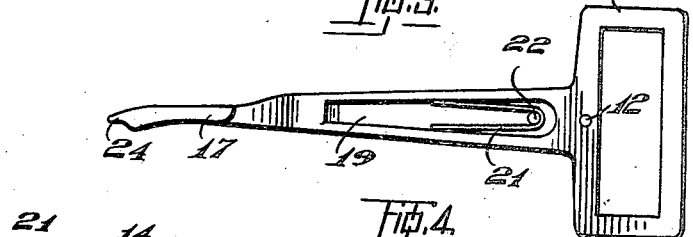
Figure 4 is a side elevation of one of the members of the snap hook.
Figure 5:
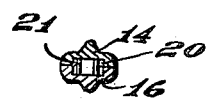
Figure 5 is a section on the line 5—5 of Figure 3.

Referring to the drawings, A represents the improved snap hook, which comprises a pair of members 10 and 11, which are pivotally connected together as at 12, and each provided at one end with an eye 13. The two eyes 13 are designed to be engaged in the known manner by the folded end of the strap or chain at the end of which the snap hook is connected.

The member 10 is formed with a shank 14 which extends into a hooked portion 15, while the member 11 is also formed with a shank 16 extending a hooked portion 17 designed to bear against the hook 15 and normally form a complete loop. The shanks 14 and 16 are each provided on their inner face with a recess 18 and 19, which recesses are designed to be opposed to one another in order to form a suitable cavity 20 in which is housed a spring 21 suitably held in position by pin 22 and kept in contracted position by the walls of the recesses 18 and 19.

As will appear from the drawings, the loop formed by the two hooked sections 15 and 17 is at right angles to the eye 13 formed on the members 10 and 11 of the snap hook.

The outer ends of the hooked extensions 15 and 17 are formed with diverging lips 23 and 24 designed to afford a means whereby the link or other device 25 to be snapped may be easily engaged and forced into the loop.

When the free link 25 of the chain or strap is to be hooked, it is grasped and forced between the two lips 23 and 24 so as to spread the hooked extensions 15 and 17 apart, when the link 25 being pushed forward will be turned or twisted laterally in order that it may become free of the ends of the hooked extensions 15 and 17, and thus fall and become engaged into the loop formed by the hooks 15 and 17.

Obviously the portions 15 and 17 will be forced back into close baffle engagement by the tension of the spring 21 which permanently bears against the walls of the cavity 20 formed within the shanks 14 and 16 of the snap hook.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A snap hook comprising a body formed of two members pivotally connected together, each member comprising a shank formed at one end with a hook, and at the other with an eye, the hooked ends being turned at right angles to the eye and so located as to form a link, a recess in the inner face of one shank registering with a recess in the other shank, and a spring in the recess, as and for the purpose described.

2. A snap hook comprising a body formed of two members pivotally connected together, each member comprising a shank formed at one end with a hook and at the other, with an eye, the hooked ends being turned at right angles to the eye and so located as to form a link, the hooked ends being also formed with spread lips designed to engage the object to be snapped, a recess in the inner face of one shank registering with a recess in the other shank, a spring in the registering recesses, and means to retain the spring therein.

In witness whereof I have hereunto set my hand in the presence of two witnesses.

ALFRED ANTOINE FRECHETTE.

Witnesses:
WILLIAM WALDIE,
ANDREW R. WALDIE.